No. 680,725. Patented Aug. 20, 1901.
P. G. McCOLLAM.
PROPELLING MECHANISM FOR BICYCLES.
(Application filed Oct. 20, 1900.)
(No Model.) 2 Sheets—Sheet 1.
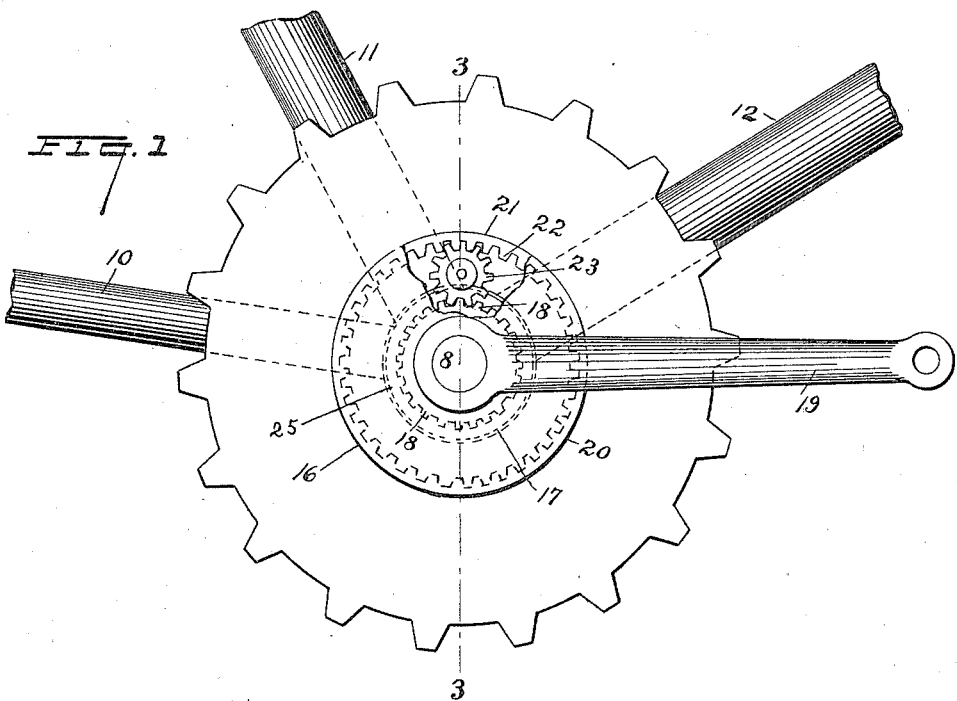
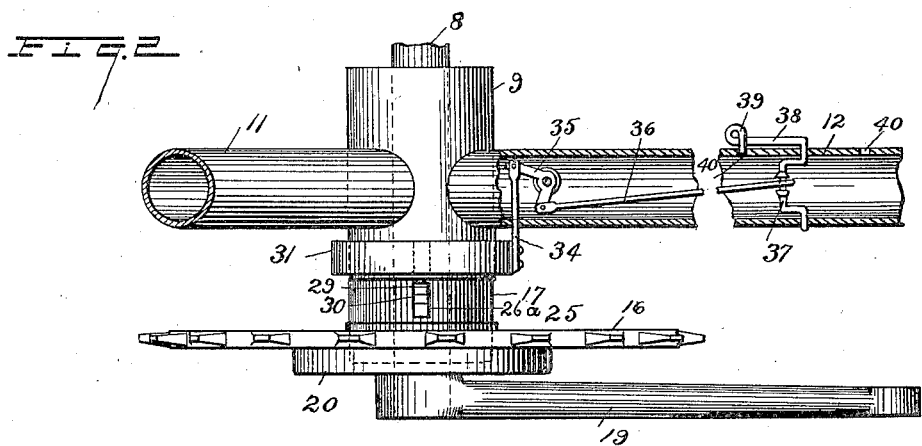

No. 680,725. Patented Aug. 20, 1901.
P. G. McCOLLAM.
PROPELLING MECHANISM FOR BICYCLES.
(Application filed Oct. 20, 1900.)
(No Model.) 2 Sheets—Sheet 2.
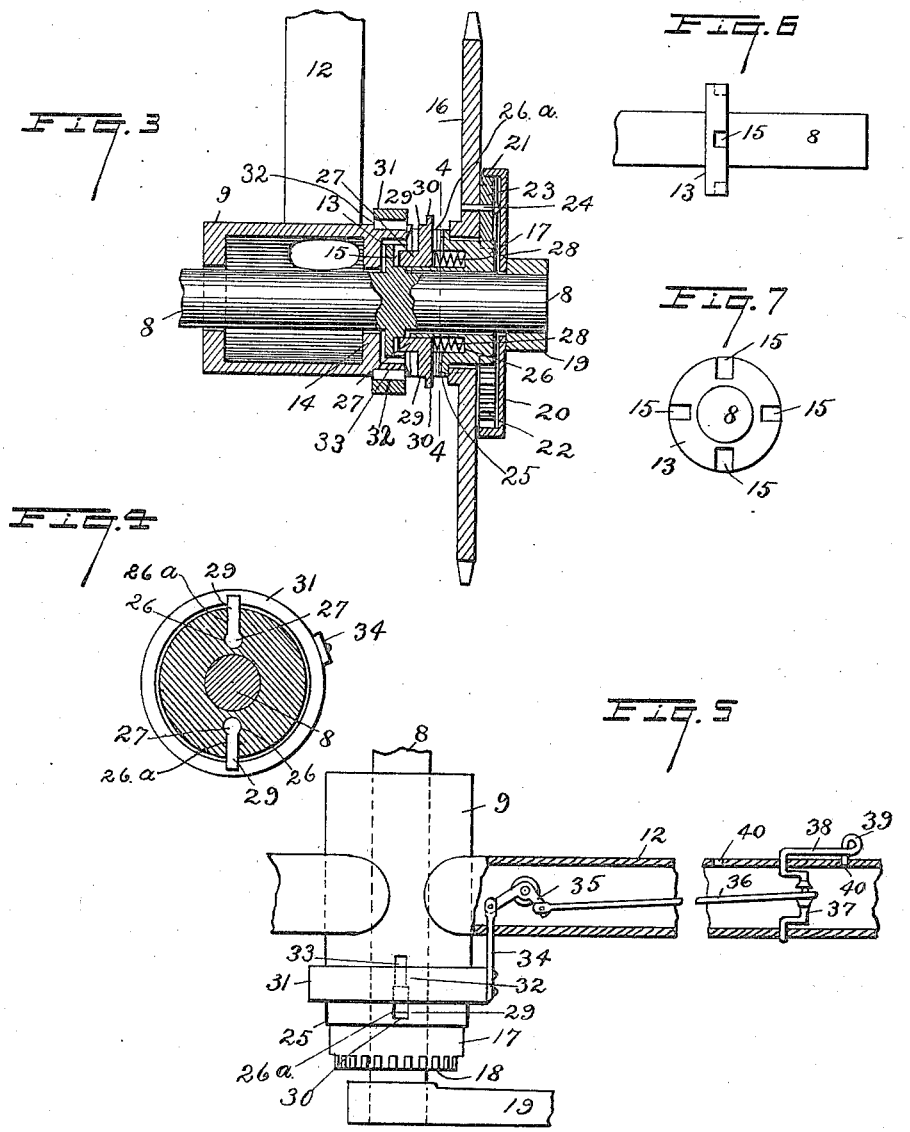

UNITED STATES PATENT OFFICE.

PATRICK G. McCOLLAM, OF EASTON, CONNECTICUT.

PROPELLING MECHANISM FOR BICYCLES.

SPECIFICATION forming part of Letters Patent No. 680,725, dated August 20, 1901.

Application filed October 20, 1900. Serial No. 33,669. (No model.)

*To all whom it may concern:*

Be it known that I, PATRICK G. McCOLLAM, a subject of the Queen of Great Britain, residing at Easton, in the county of Fairfield and State of Connecticut, have invented certain new and useful Improvements in Propelling Mechanism for Bicycles, of which the following is a full and complete specification, such as will enable those skilled in the art to which it appertains to make and use the same.

This invention relates to the propelling mechanism of bicycles and similar vehicles; and the object thereof is to provide an improved mechanism for this purpose by means of which the speed of the sprocket-wheel on the pedal-shaft may be decreased or increased whenever desired; and with this and other objects in view the invention consists in a propelling mechanism for bicycles and similar vehicles constructed as hereinafter described and claimed.

The invention is fully disclosed in the following specification, of which the accompanying drawings form a part, in which—

Figure 1 is a side view of the pedal-shaft of a bicycle or similar vehicle and the parts connected therewith and showing my improved propelling mechanism, part of the construction being shown in section; Fig. 2, a plan view of the same, part of the construction being shown in section; Fig. 3, a partial section on the line 3 3 of Fig. 1; Fig. 4, a section on the line 4 4 of Fig. 3; Fig. 5, a plan view of the construction shown in Fig. 2, showing the parts in a different position and omitting the sprocket-wheel on the pedal-shaft, part of the construction being also in section; Fig. 6, a side view of a part of the pedal-shaft, showing a lock-disk connected therewith; and Fig. 7, an end view thereof.

In the drawings forming part of this specification the separate parts of my improvement are designated by the same reference characters in each of the views, and in said drawings I have shown the pedal-shaft 8 mounted in the usual crank hanger or hub 9, with which the frame-rods 10, 11, and 12 are connected, the frame-rod 12 being that which extends upwardly and forwardly to the front tubular head of the frame, through which the front fork passes, said tubular head and front fork not being shown. The pedal-shaft 8 is provided with a clutch rim or disk 13, which may be formed integrally therewith or secured thereto, and which abuts against an inwardly-directed flange or rim 14 on the hub 9, and said clutch rim or disk is provided with notches or recesses 15 in the outer face thereof, four of which are shown in Fig. 7.

The sprocket-wheel 16 is provided with a loose hub 17, which is also loosely mounted on the pedal-shaft 8 and the outer end of which is provided with an annular gear 18. The pedal-crank 19, adjacent to the sprocket-wheel 16, is provided with a circular casing 20, having an inwardly-directed rim 21, provided with an internal annular gear 22, and between the hub 17 of the sprocket-wheel 16 and the annular gear 22 is mounted a pinion 23, said pinion being connected with the sprocket-wheel, as shown at 24 in Fig. 3, and the pinion 23 meshes with the gears 18 and 22, as is clearly shown in Figs. 1 and 3.

The hub 17 is provided inside the sprocket-wheel 16 with an annular shoulder or stop 25, which serves to hold said sprocket-wheel in position, and any other means may be employed for this purpose, and formed in the inner end of said hub are longitudinal chambers 26, in which are mounted clutch-plugs 27, which are forced inwardly by springs 28, and said clutch-plugs are provided with radial projections 29, preferably provided with radial lugs or extensions 30, both of which extend radially beyond the hub 17, through slots 26ª formed therein, and which communicate with the chambers 26, and said clutch-plugs 27 are adapted to engage the notches or recesses 15 in the clutch flange or rim 13, which is secured to or formed on the pedal-shaft 8.

Mounted on the end of the hub 9, adjacent to the sprocket-wheel 16, is a band 31, which is adapted to slide on said hub and which is provided with internal radial ribs 32, which fit in corresponding grooves 33 in the hub 9, and said band is connected by an arm 34 with a crank 35, mounted in the tubular frame-rod 12, and one end of which is pivotally connected with a crank-rod 36, which passes upwardly through said frame-rod 12 and is connected with a crank-shaft 37, one end of which is provided with a spring-crank 38, having a finger 39, which is adapted to enter corresponding holes or recesses 40 in the frame-rod 12, and by means of this construction the band 31, which serves as a clutch-band, may be moved longitudinally of the hub 9 by means of the crank 38, and the clutch-band 31 is adapted to operate the clutch-plugs 27 and to force them out of the notches or recesses 15 when the said clutch-band is moved outwardly, and when said clutch-band is moved inwardly the clutch-plugs 27 are forced into the notches or recesses 15 in the clutch flange or rim 13 by the springs 28.

In the operation of the clutch-band 31, as above described, in its outward movement it passes over the end of the radial projections 29 of the clutch-plugs 27 and strikes against the lugs or extensions 30 thereof, and when said band 31 is held in this position the clutch-plugs 27 are forced outwardly and released from the clutch flange or rim 13, and the internal ribs 32 on the band 31 enter the slots 26$^a$ in the hub 17, and said hub is thus locked to said clutch-band, which is free to slide upon but cannot turn on the hub 9.

The operation will be readily understood from the foregoing description when taken in connection with the accompanying drawings and the following statement thereof.

It will be understood that the pedal-crank is keyed to or otherwise secured to the pedal-shaft 8 and the circular casing 20 is secured thereto, and when the parts are in the position shown in Fig. 3, or when the clutch-band 31 is at the inner limit of its movement, the clutch-plugs 27 engage the flange or rim 13 and the hub 17 is locked to the pedal-shaft, and said hub and the sprocket-wheel 16 revolve with the pedal-shaft. This is the position of the parts when high speed is required, but when going uphill and when an increase of power is necessary the clutch-band 31 is moved outwardly and strikes the radial lugs or extensions 30 of the radial projections 29 of the clutch-plugs 27 and forces said clutch-plugs outwardly and disengages the same from the flange or rim 13. This releases the hub 17, and at this time the inner ribs 32 on the band 31 enter the stop 26$^a$ and lock the hub 17 to said band, and in this position of the parts the sprocket-wheel 16 revolves independently of the hub 17 and at a much lower rate of speed than that of the pedal-crank shaft. The difference between the degree of the speed of the sprocket-wheel 16 and the pedal-crank will depend upon the dimensions of the pinion 23 and of the gears 18 and 22, the movement of the pedal-crank and shaft being transmitted to the sprocket-wheel by means of this pinion and said gears, and in practice I prefer to regulate the dimensions of these parts in such manner that the sprocket-wheel will turn about two revolutions for each three of the pedal-crank and shaft.

My invention is not limited to the connection of the clutch-band 31 with the crank 35 by means of the arm 34, as herein shown and described, this construction being illustrated simply as a matter of convenience, and in practice the connection between the clutch-band 31 and the crank 35 may be made in any desired manner, and various other changes in and modifications of this construction, as well as changes in and modifications of the other features of the propelling mechanism, as herein shown and described, may be made without departing from the spirit of my invention or sacrificing its advantages, and I reserve the right to make all such alterations therein as fairly come within the scope of the invention.

Having fully described my invention, I claim as new and desire to secure by Letters Patent—

1. The herein-described propelling mechanism for bicycles and similar vehicles the frames of which are provided with a crank-hanger, comprising a hub loosely mounted on the pedal-shaft and provided at its outer end with an annular gear, a sprocket-wheel loosely mounted on the said hub, a circular casing secured to the pedal-crank and provided at its perimeter with an internal gear, a pinion connected with the sprocket-wheel and meshing with the internal gear of said casing, and with the gear on said hub, a clutch flange or disk secured to the pedal-shaft, spring-operated clutch-plugs mounted in the inner end of said hub and adapted to engage with said clutch flange or disk, and a movable clutch-band mounted on the crank-hanger and adapted to force said clutch-plugs outwardly, substantially as shown and described.

2. The herein-described propelling mechanism for bicycles and similar vehicles the frames of which are provided with a crank-hanger, comprising a hub loosely mounted on the pedal-shaft and provided at its outer end with an annular gear, a sprocket-wheel loosely mounted on the said hub, a circular casing secured to the pedal-crank and provided at its perimeter with an internal gear, a pinion connected with the sprocket-wheel and meshing with the internal gear of said casing, and with the gear on said hub, a clutch flange or disk secured to the pedal-shaft, spring-operated clutch-plugs mounted in the inner end of said hub and adapted to engage with said clutch flange or disk, and a movable clutch-band mounted on the crank-hanger and adapted to force said clutch-plugs outwardly, said clutch-plugs being provided with radial extensions which pass through slits formed in said hub and which are adapted to be engaged by said band, substantially as shown and described.

3. The herein-described propelling mechanism for bicycles and similar vehicles the frames of which are provided with a crank-hanger, comprising a hub loosely mounted on the pedal-shaft and provided at its outer end with an annular gear, a sprocket-wheel loosely mounted on the said hub, a circular casing secured to the pedal-crank and provided at its perimeter with an internal gear, a pinion connected with the sprocket-wheel and meshing with the internal gear of said casing, and with the gear on said hub, a clutch flange or disk secured to the pedal-shaft, spring-operated clutch-plugs mounted in the inner end of said hub and adapted to engage with said clutch flange or disk, and a movable clutch-band mounted on the crank-hanger and adapted to force said clutch-plugs outwardly, said clutch-plugs being provided with radial extensions which pass through slits formed in said hub and which are adapted to be engaged by said band, and a device mounted in one of the frame-rods of the vehicle for operating said band, substantially as shown and described.

In testimony that I claim the foregoing as my invention I have signed my name, in presence of the subscribing witnesses, this 17th day of October, 1900.

PATRICK G. McCOLLAM.

Witnesses:
S. N. OSBORN,
HUGH BRADY.